(12) United States Patent
Agarwal

(10) Patent No.: US 11,258,819 B1
(45) Date of Patent: Feb. 22, 2022

(54) SECURITY SCORING BASED ON MULTI DOMAIN TELEMETRY DATA

(71) Applicant: Shape Security, Inc., Santa Clara, CA (US)

(72) Inventor: Sumit Agarwal, Pal Alto, CA (US)

(73) Assignee: SHAPE SECURITY, INC., Santa Clara, CA (US)

(*) Notice: Subject to any disclaimer, the term of this patent is extended or adjusted under 35 U.S.C. 154(b) by 64 days.

(21) Appl. No.: 16/881,251

(22) Filed: May 22, 2020

Related U.S. Application Data

(60) Provisional application No. 62/851,586, filed on May 22, 2019.

(51) Int. Cl.
*H04L 29/06* (2006.01)

(52) U.S. Cl.
CPC .......... *H04L 63/1433* (2013.01); *H04L 63/08* (2013.01); *H04L 63/20* (2013.01)

(58) Field of Classification Search
CPC ...... H04L 63/1433; H04L 63/08; H04L 63/20
See application file for complete search history.

(56) References Cited

U.S. PATENT DOCUMENTS

| 9,800,606 | B1* | 10/2017 | Yumer | G06F 21/577 |
|---|---|---|---|---|
| 2011/0140913 | A1* | 6/2011 | Montenero | G08B 21/0233 |
| | | | | 340/870.07 |
| 2011/0175999 | A1* | 7/2011 | McCormack | H04N 7/183 |
| | | | | 348/143 |
| 2015/0369705 | A1* | 12/2015 | Kruglick | H04L 51/043 |
| | | | | 702/188 |
| 2017/0362934 | A1* | 12/2017 | Switzer | E21B 47/12 |
| 2019/0384580 | A1* | 12/2019 | Martini | H04W 76/12 |
| 2020/0344203 | A1* | 10/2020 | Mermoud | H04L 67/22 |

\* cited by examiner

*Primary Examiner* — Kambiz Zand
*Assistant Examiner* — Aubrey H Wyszynski
(74) *Attorney, Agent, or Firm* — Troutman Pepper Hamilton Sanders LLP (Rochester)

(57) ABSTRACT

A method, non-transitory compute r readable medium, device, and system that receives telemetry data collected based on instrumentation code executed at one of a plurality of client computing devices with a requested transaction with one of a plurality of web server systems. Identifying signal data (IDSD) usable to identify the one of client computing devices is determined based on the received telemetry data. Any matching telemetry data in a telemetry data set for a plurality of prior transactions between one or more of the client computing devices and one or more of the web server systems is identified based on any stored IDSDs that match the received IDSD. A security score associated with the one of the client computing devices is generated based on the identified matching telemetry data. A response to the requested transaction to the one of client computing devices is managed based on the generated security score.

20 Claims, 8 Drawing Sheets

Request 1: Client Device A to Web Server System X
Request 2: Client Device B to Web Server System Y
Request 3: Client Device A to Web Server System Y

SECURITY SCORING BASED ON MULTI DOMAIN TELEMETRY DATA

This application claims the benefit of U.S. Provisional Patent Application Ser. No. 62/851,586 filed May 22, 2019, which is hereby incorporated by reference in its entirety.

FIELD

This technology generally relates to security techniques applicable to client(s) and server system(s), and more specifically to security scoring.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Web and mobile applications face sophisticated attacks. The sophisticated attacks can include attackers using automated software to imitate human behavior, such as receiving instructions from a web server and autonomously generating requests based on those instructions. For example, a bot may receive a web page, gather data in one or more objects defined in the web page, and generate a request for another web page to gather additional data, as if a user using a browser was requesting a new web page. A bot may also generate and send requests to simulate a user submitting data to a web server through a browser or an application.

Attackers may use bots to commit many types of unauthorized acts, crimes or computer fraud, such as web site or content scraping, ratings manipulation, fake account creation, reserving rival goods attacks, ballot stuffing attacks, password snooping, vulnerability assessments, brute force attacks, click fraud, denial-of-service (DoS) attacks, bidding wars, and system fingerprinting attacks. Illicit organizations place malware, or malicious software, on client computing devices (e.g. smartphones, tablets, laptops, and/or desktops) owned by law-abiding people. Such malware is then used to control these client computers to commit such attacks on a large scale.

Web server administrators want to prevent malicious users from attacking a site, while allowing legitimate users to use the site as intended. To accomplish this, some websites implement multi-factor authentication, which requires a user to possess multiple factors in order to gain access. For example, a common two-factor authentication scheme requires a user to provide a password and a security code sent to a mobile device by text, or generated on the mobile device using software installed on the mobile device. The password is a knowledge factor since it is a secret that is known to the user, while the security code is a possession factor since it presumes possession of the mobile device. A website may also require re-authentication at various points, such as after a period of time, or when a particular type of transaction is initiated, such as a purchase. The user may also be asked to complete a CAPTCHA or other challenge-response test that differentiates human users from automated software that is mimicking a human.

While such safeguards increase security, they unfortunately increase user friction when the user interacts with the web content through a website or application. For example, increased user friction may be associated with reduced use, including a lower completion rate for transactions, such as checkout, or other activities. That is, security safeguards that increase the burden on a legitimate user may negatively impact a website if the increased user friction causes decreased usage and/or incomplete transactions.

SUMMARY

A method includes receiving telemetry data collected based on instrumentation code executed at one of a plurality of client computing devices with a requested transaction with one of a plurality of web server systems. Identifying signal data (IDSD) usable to identify the one of client computing devices is determined based on the received telemetry data. Any matching telemetry data in a telemetry data set for a plurality of prior transactions between one or more of the client computing devices and one or more of the web server systems is identified based on any stored IDSDs that match the received IDSD. A security score associated with the one of the client computing devices is generated based on the identified matching telemetry data. A response to the requested transaction to the one of client computing devices is managed based on the generated security score.

A non-transitory computer readable medium having stored thereon instructions for workload processing comprising executable code that, when executed by one or more processors, causes the one or more processors to receive telemetry data collected based on instrumentation code executed at one of a plurality of client computing devices with a requested transaction with one of a plurality of web server systems. Identifying signal data (IDSD) usable to identify the one of client computing devices is determined based on the received telemetry data. Any matching telemetry data in a telemetry data set for a plurality of prior transactions between one or more of the client computing devices and one or more of the web server systems is identified based on any stored IDSDs that match the received IDSD. A security score associated with the one of the client computing devices is generated based on the identified matching telemetry data. A response to the requested transaction to the one of client computing devices is managed based on the generated security score.

A security server device, comprising memory comprising programmed instructions stored thereon and one or more processors configured to be capable of executing the stored programmed instructions to receive telemetry data collected based on instrumentation code executed at one of a plurality of client computing devices with a requested transaction with one of a plurality of web server systems. Identifying signal data (IDSD) usable to identify the one of client computing devices is determined based on the received telemetry data. Any matching telemetry data in a telemetry data set for a plurality of prior transactions between one or more of the client computing devices and one or more of the web server systems is identified based on any stored IDSDs that match the received IDSD. A security score associated with the one of the client computing devices is generated based on the identified matching telemetry data. A response to the requested transaction to the one of client computing devices is managed based on the generated security score.

A network traffic management system, comprising one or more network security apparatuses, server devices, or client devices with memory comprising programmed instructions stored thereon and one or more processors configured to be capable of executing the stored programmed instructions to receive telemetry data collected based on instrumentation code executed at one of a plurality of client computing devices with a requested transaction with one of a plurality of web server systems. Identifying signal data (IDSD) usable to identify the one of client computing devices is determined based on the received telemetry data. Any matching telemetry data in a telemetry data set for a plurality of prior transactions between one or more of the client computing devices and one or more of the web server systems is identified based on any stored IDSDs that match the received IDSD. A security score associated with the one of the client computing devices is generated based on the identified matching telemetry data. A response to the requested transaction to the one of client computing devices is managed based on the generated security score.

Figure 1:
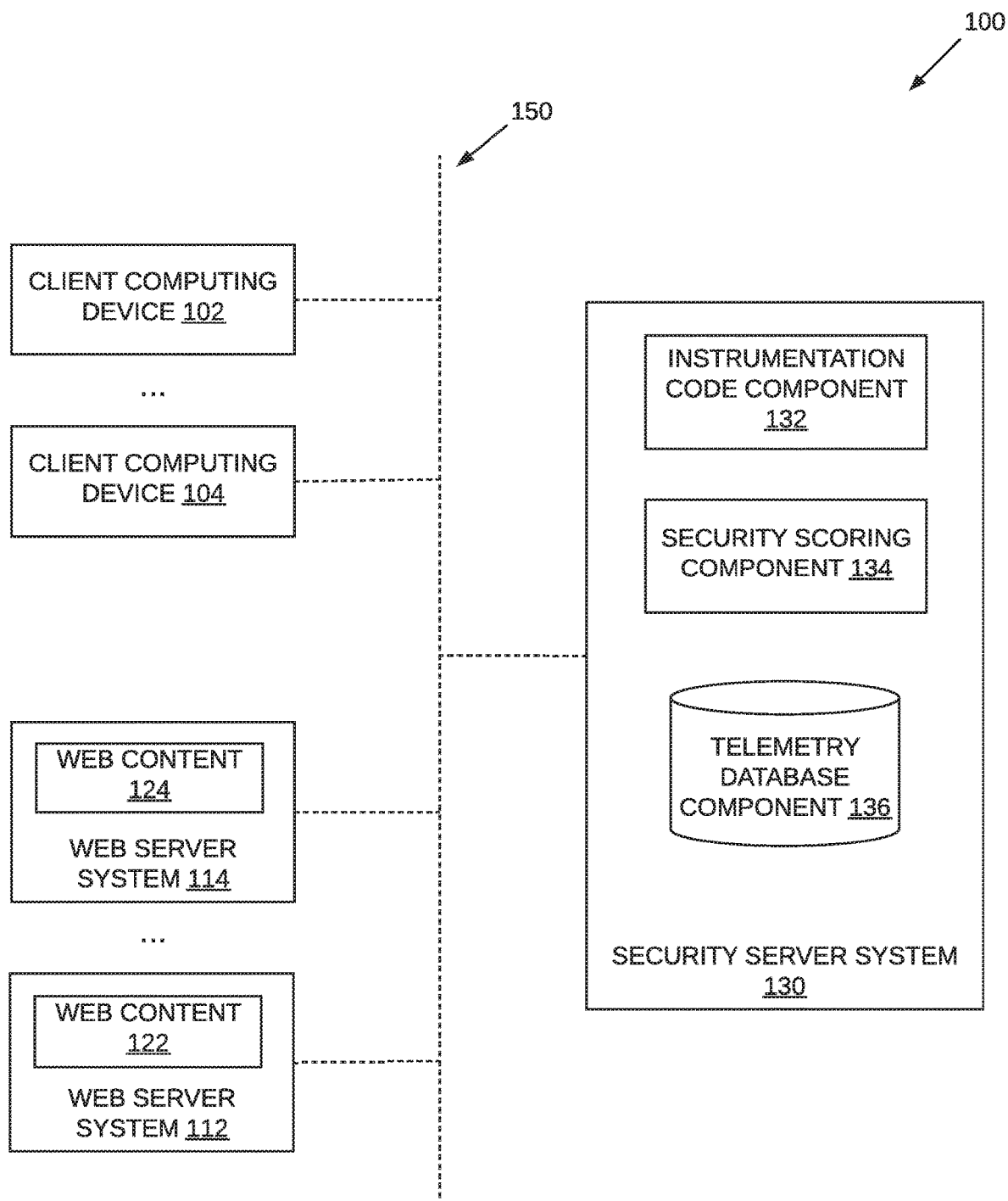
FIG. 1 is a block diagram of a computer system that includes an example of a security server system.

While each of the drawing figures illustrates a particular example for purposes of illustrating a clear example, other examples may omit, add to, reorder, or modify any of the elements shown in the drawing figures. For purposes of illustrating clear examples, one or more figures may be described with reference to one or more other figures, but using the particular arrangement illustrated in the one or more other figures is not required in other examples.

DETAILED DESCRIPTION

In the following description, for the purpose of explanation, numerous specific details are set forth in order to provide a thorough understanding of examples of the technology. It will be apparent, however, that examples of the technology may be practiced without these specific details. In other instances, well-known structures and devices are shown in block diagram form in order to avoid unnecessarily obscuring examples of the technology.

It will be further understood that: the term "or" may be inclusive or exclusive unless expressly stated otherwise; the term "set" may comprise zero, one, or two or more elements; the terms "first", "second", "certain", and "particular" are used as naming conventions to distinguish elements from each other and does not imply an ordering, timing, or any other characteristic of the referenced items unless otherwise specified; the terms "such as", "e.g.", "for example", and the like describe one or more examples but are not limited to the described example(s); the terms "comprises" and/or "comprising" specify the presence of stated features, but do not preclude the presence or addition of one or more other features.

A "computer system" refers to one or more computers, such as one or more physical computers, virtual computers, and/or computing devices. As an example, a computer system may be, or may include, one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to a "computer system" herein may mean one or more computers, unless expressly stated otherwise. When a computer system performs an action, the action is performed by one or more computers of the computer system.

A "client" refers to a combination of integrated software components and an allocation of computational resources, such as memory, a computing device, and processes on a computing device for executing the integrated software components. The combination of the software and computational resources are configured to interact with one or more servers over a network, such as the Internet. A client may refer to either the combination of components on one or more computers, or the one or more computers.

A "server" (also referred to as "server system" or "server computer system") refers to a combination of integrated software components and an allocation of computational resources, such as memory, a computing device, and processes on the computing device for executing the integrated software components. The combination of the software and computational resources provide a particular type of function on behalf of clients of the server. A server may refer to either the combination of components on one or more computers, or the one or more computers. A server may include multiple servers; that is, a server may include a first server computing device and a second server computing device, which may provide the same or different functionality to the same or different set of clients.

"Instrumentation code" refers to source code, bytecode, or binary software that is executed on a computer. For example, instrumentation code may be JavaScript that generates data on a client and sends that data, referred to as telemetry data, to a server. Also, for example, instrumentation code may be a pre-compiled library that embedded into a mobile application using a compiler or linker. The instrumentation code may send the telemetry data to a server over one or more requests or transactions. The instrumentation code may attach telemetry data to one or more subsequent requests or transactions.

General Overview

This document generally describes systems, methods, devices, and other techniques for security scoring based on multi-domain telemetry data. For a transaction between a client computing device and a web server system, a security score is generated based on telemetry data for one or more prior transactions between the client computing device and one or more other web server systems. The security score may be generated by a security server system that receives and processes the telemetry data. The security score is used to reduce user friction for a legitimate user when the user interacts with the web content. For example, an additional authentication procedure may be bypassed when the security score is sufficient.

Instrumentation code is provided for execution at a client computing device to collect telemetry data about particular signals, such as properties of the client computing device, operations performed at the client computing device and/or user interaction at the client computing device. The telemetry data may be collected for a plurality of client computing devices interacting with a plurality of web server systems.

A security score is generated for a client computing device interacting with a first web server system based on matching telemetry data collected for one or more associated transactions involving the client computing device, such as a transaction between the client computing device and another web server system. The security score allows a client computing device's prior transaction history to be used to evaluate the client computing device. The prior transaction history may include multi-domain telemetry data collected during transactions between the client computing device and other web server systems.

For example, a security score may be determined based on telemetry data received from a particular client computing device in association with a first transaction with a first web server system. First identifying signal data (IDSD) is generated based on the telemetry data. The first IDSD is usable to identify the client computing device. For example, the IDSD may be based on data that is likely unique to the client computing device and/or a particular user. Matching telemetry data for one or more associated transactions is identified using the IDSD. For example, in some examples, if prior telemetry data was collected when the client computing device interacted with a second web server system, the prior telemetry data will have the same IDSD.

The security score is generated based on the matching telemetry data collected for the one or more associated transactions. For example, the security score may be based on whether the one or more associated transactions involving the particular client computing device were determined to be an attack or part of an attack. In some examples, the security score is based on a number of valid associated transactions that were determined to not be an attack or part of an attack.

In some examples, the security score is used to streamline user authentication, such as to bypass an additional authentication procedure. For example, when the corresponding transaction(s) involving the particular client computing device involve an authenticated user, the security score may indicate a confidence value in an identity of a user of the client computing device that is generated based on one or more prior successful or failed authentications associated with the client computing device or the user. In some examples, the telemetry data is collected for a plurality of login transactions between a plurality of client computing devices and a plurality of web server systems.

The various techniques described herein may achieve one or more of the following advantages: a web content provider may better protect its users and itself from fraudsters; the web content provider may reduce user friction for legitimate users; in particular, the web content provider may reduce negative impacts caused by increased user friction, such as decreased usage and/or incomplete transactions; the protection may be provided relatively simply for the web content providers in certain implementations; in particular implementations, such security can be added without the web content provider having to install any new hardware or software on its own server systems; security code and/or systems can be provided flexibly by an organization that specializes in web security, which can in turn keep the security code updated to address ever-changing security threats; such a security organization can also aggregate data received across many entities that operate many domains, including telemetry data and/or analyzed telemetry data; such a security organization can use such aggregated data to generate countermeasures that are more effective than countermeasures that could be developed using only data from a single domain. Additional features and advantages are apparent from the specification and the drawings.

System Overview

Referring to FIG. 1, an example of a computer system 100 includes a plurality of client computing devices 102-104, a plurality of web server systems 112-114, and a security server system 130 is illustrated, although the system may comprise other types and/or numbers of other systems, devices, components and/or other elements in other configurations.

In this example, the plurality of client computing devices 102-104 comprise computing devices that may request and obtain web content 122-124 from one or more of the web server systems 112-114, although the plurality of client computing devices 102-104 may perform other types and/or numbers of operations and/or functions such as those illustrated and described by way of the examples herein.

In this example, the web server systems 112-114 comprise computing devices that host web content 122-124 which is available to one or more of the client computing devices 102-104, although the web server systems 112-114 may perform other types and/or numbers of operations and/or functions such as those illustrated and described by way of the examples herein. For example, the web content 122-124 may include one or more web pages, images, audio, video, messages, files, data, scripts, services, application content, and other content available over the Internet or another wide area network. In some examples, the web content 122-124 may include any data, instructions, or other content provided by the web server systems 112-114 over the Internet, such as one or more responses to requests from the client computing devices 102-104.

In this example, the security server system 130 performs security scoring based on multi-domain telemetry data, although other types of data or other information may be used. The security server system 130 includes an instrumentation code component 132, a security scoring component 134, and a telemetry database component 136, although the security server system may have other types and/or numbers of other components, modules, and/or other programmed instructions or other data in memory. The security server system 130 and/or its components (e.g. instrumentation code component 132, security scoring component 134, and/or telemetry database component 136) as described herein are presented as individual components for ease of explanation; any action involving one or more components of the security server system 130 may be considered performed with respect to the security server system 130. The security server system 130 and/or its components may be implemented as one or more dependent or independent processes, and may be implemented on one or multiple computers; for example, a component may be implemented as a distributed system; alternatively and/or in addition, multiple instances of one or more components may be implemented. Furthermore, a component shown may be implemented fully and/or partially in one or more programs or processes, and two or more components shown may be implemented fully and/or partially in one program and/or process.

The instrumentation code component 132 provides instrumentation code to collect telemetry data about a particular signal or signals at one of the client computing devices 102-104, although other types of data may be collected. In some examples, the instrumentation code component 132 provides instrumentation code to a particular one of the client computing devices 102-104 when the particular one of the client computing devices 102-104 interacts with a particular one of the web server systems 112-114. In this example, the instrumentation code, when executed at one of the client computing devices 102-104, collects telemetry data which is provided or otherwise available to the security server system 130. The telemetry data may include properties of the one of the client computing devices 102-104, an operating state of the one of the client computing devices 102-104, operations performed at the one of the client computing devices 102-104, user interaction at the one of the client computing devices 102-104, and/or other telemetry data or other information.

The security server system 130 receives and processes the telemetry data collected at one or more of the client computing devices 102-104. In some examples, the security server system 130 maintains a telemetry database. For example, the telemetry database component 136 may store a telemetry data set for a plurality of transactions between one or more of the client computing devices 102-104 and one or more of the web server systems 112-114. In some examples, when the security server system 130 receives and processes telemetry data for one or more of the client computing devices 102-104, the security server system 130 adds the telemetry data to the telemetry data set.

The security scoring component 134 generates a security score for each of the client computing devices 102-104 that interact with a particular one or ones of the web server systems 112-114. In this example, based on the telemetry data received from the one of the client computing devices 102-104 in association with a transaction with the one of the web server systems 112-114, the security scoring component 134 determines identifying signal data (IDSD) usable to identify the one of the client computing devices 102-104.

Based on the IDSD, the security scoring component 134 identifies matching telemetry data in a set of stored telemetry data for a plurality of transactions. In this example, the matching telemetry data in the telemetry database component 136 has an IDSD that matches the IDSD received from the one of the client computing devices 102-104. The matching telemetry data corresponds to one or more associated transactions that may include other transactions involving the particular one of the client computing devices 102-104, such as prior transactions with the same web server system 112 and/or prior transactions with another web server system 114. Based on the matching telemetry data, the security scoring component 134 generates a security score. The security score allows the prior transaction history of the one of the client computing devices 102-104 to be used to evaluate the one of the client computing devices 102-104.

In some examples, the security server system 130 is operated by a security company or other entity that provides web security services. The plurality of web server systems 112-114 may, for example, be operated by web entities that are customers of the security company. The plurality of client computing devices 102-104 are operated by users of a website, application, or other service provided by the web entities that operate the plurality of web server systems 112-124. A particular user may be a user of a single web server system or multiple web server systems of the plurality of web server systems 112-114.

The client computing devices 102-104, the web server systems 112-114 and the security server system 130 communicate over one or more networks 120. The network(s) 120 may include one or more local area networks (LANs) and/or one or more wide area networks, such as the Internet. The network arrangement and connectivity between the client computing devices 102-104, the web server systems 112-114 and the security server system 130 may vary. For example, an in-line configuration and an out-of-band configuration for a security server system that performs security scoring are described in greater detail hereinafter.

Instrumentation Code

The instrumentation code component 132 provides instrumentation code to the plurality of client computing devices 102-104. For example, when a particular one of the client computing devices 102-104 requests web content 122 from a particular one of the web server systems 112-114, the web content 122 may reference instrumentation code from one or more locations associated with the security server system 130, causing the client computing device 112 to request and receive the instrumentation code from the instrumentation code component 132. Alternatively and/or in addition, the interaction may include a user interacting with an application on one of the client computing devices 102, such as a web application or a native application installed on a computer or a mobile device. For example, the one of the web server systems 112-114 may include an application server that interacts with an application installed on one of the client computing device 102-104.

In some examples, the instrumentation code component 132 provides different instrumentation code in different situations. For example, the instrumentation code component 132 may provide different instrumentation code to clients of different web server systems 112-114. In some examples, the instrumentation code component 132 provides different instrumentation code for different client computing devices 102-104. For example, different instrumentation code may be provided when client computing devices 102-104 are running different browsers, operating systems, or other software (including different versions thereof), or when the security server system 130 determines that one or more of the client computing devices 102-104 pose a different amount or type of security risk.

The interactions between one of the client computing devices 102-104 and one of the web server systems 112-114 described herein may belong to a transaction between the one of the web server systems 112-114 and the one of the client computing devices 102-104. For example, the instrumentation code may be provided during an authentication transaction, such as when a user of the one of the client computing devices 102-104 provides credentials to log in to a system provided by the one of the web server systems 112-114. In some examples, the instrumentation code component 132 provides instrumentation code to the one of the client computing devices 102-104 during transactions of one or more specific transaction types between the one of the client computing devices 102-104 and one of the web server systems 112-114, such as authentication transactions, purchase transactions, financial transactions, data submission, account creation, and/or other transaction types.

The instrumentation code may be provided in different formats. For example, the instrumentation code may include JavaScript code and/or other web code that executes in a browser or other JavaScript engine at the one of the client computing devices 102-104. The instrumentation code may be provided with web code requested by the one of the client computing devices 102-104. In some examples, the instrumentation code may be obfuscated to prevent an attacker from understanding the instrumentation code, and/or integrated with the web code to prevent execution of the web code without execution of the instrumentation code. In some examples, at least a portion of the instrumentation code is provided in an application installed at the one of the client computing devices 102-104 by providing a Software Development Kit (SDK) to a developer of the application. When the application at the one of the client computing devices 102-104 interacts with the application server of one of the web server systems 112-114, the application may also interact with the instrumentation code component 132 at the security server system 130, such as by sending telemetry data and/or obtaining additional instrumentation code for execution at the one of the client computing devices 102-104.

Telemetry Data

The security server system 130 receives and processes telemetry data collected at one or more of the client computing devices 102-104, although the system may receive and process other data and/or information. For example, the instrumentation code may include instructions to collect telemetry data about particular signal(s) at a particular one of the client computing devices 102-104 and provide the collected telemetry data to the security server system 130. As used herein, the term "signal" refers to a specific type of data to collect at the one of the client computing devices 102-104, such as a particular property or other aspect of: the one of the client computing devices 102-104, an operating state of the one of the client computing devices 102-104, one or more operations performed at the one of the client computing devices 102-104, user interaction at the one of the client computing devices 102-104, and/or other telemetry data generated at the one of the client computing devices 102-104 by way of example only.

As used herein, the term "signal value" refers to a value for a signal (e.g. the specific type of data) at the one of the client computing devices 102-104, as detected by the instrumentation code. For example, a signal may be an IP address, while a signal value collected at the one of the client computing devices 102-104 is the IP address of the one of the client computing devices 102-104 (e.g. 123.456.78.9). Other signals may include network properties, operating system properties, browser properties, installed software properties, display size, other hardware properties, device configuration properties, information about execution of web code or other web content at the one of the client computing devices 102-104, information about processing of web content received at the one of the client computing devices 102-104, information about interactions with the web content at the one of the client computing devices 102-104, information about user inputs at the one of the client computing devices 102-104, and other signals that are collectable when the instrumentation code is executed at the one of the client computing devices 102-104. In some examples, a different number of signals may be collected for different transactions.

In some examples, the security server system 130 uses the telemetry data to perform operations in addition to security scoring based on multi-domain telemetry data. For example, the security server system 130 may evaluate the telemetry data for received in association with a transaction to determine whether the transaction is involved in an attack, such as whether the one of the client computing devices 102-104 is controlled for example by automated malicious software or a human user. The security server system 130 may use the telemetry data to prevent an attack in real time, such as by such as blocking, redirecting, or flagging communications from the one of the client computing devices 102-104. Alternatively and/or in addition, the security server system 130 may use the telemetry data to learn about new attacks and deploy new countermeasures for real-time attack detection and prevention.

Identifying Signal Data (IDSD)

The security server system 130 determines identifying signal data (IDSD) based on the telemetry data received from a particular one of the client computing devices 102-104. The IDSD is usable to identify other transactions involving the particular one of the client computing devices 102-104. For example, when the identifying signals used to generate the IDSD are selected to distinguish client computing devices 102-104, other telemetry data received from the particular one of the client computing devices 102-104 in other interactions will have the same IDSD. With the IDSD, in some examples of this technology a stored cookie may by unnecessary to provide the necessary security for a transaction.

Figure 2A:
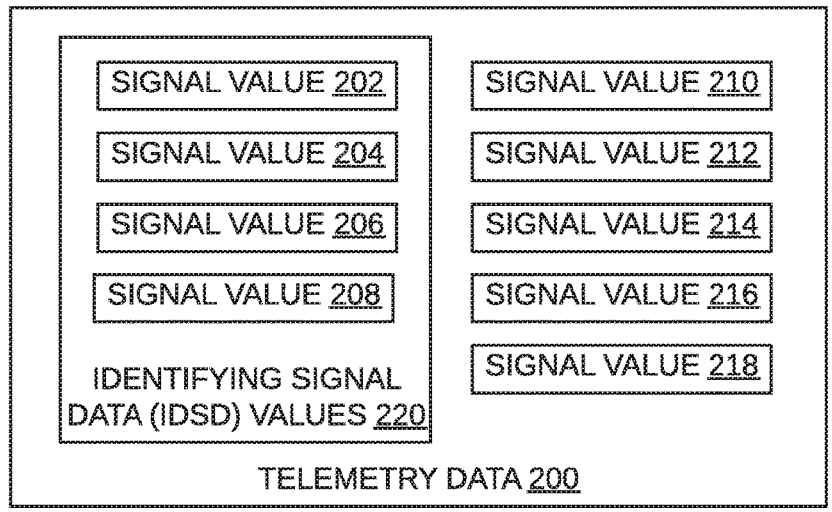
FIG. 2A is a block diagram of an example of telemetry data that includes an identifying signal data (IDSD)

Referring to FIG. 2A, a diagram of telemetry data that includes identifying signal data (IDSD) in an example is illustrated. The telemetry data 200 is generated at a client computing device (e.g. One of the client computing devices 102-104) when instrumentation code provided by a security server system (e.g. security server system 130) is executed at the one of the client computing devices 102-104.

In this example, the telemetry data 200 includes a plurality of signal values 202-218, although other types and/or numbers of signal values or other data may be used. As discussed earlier, in this example the instrumentation code provided to the one of the client computing devices 102-104, when executed at the one of the client computing devices 102-104 collects these exemplary signal values 202-218 for a set of specified signals. For example, the instrumentation code may collect a display size signal of the one of the client computing devices 102-104, and the reported signal value 202 for the display size signal may indicate dimensions of 1440×2560 pixels.

The telemetry data 200 includes identifying signal data (IDSD) values 220. The IDSD values 220 include at least a portion of the telemetry data 200. For example, the IDSD values 220 include signal values 202-208. The telemetry data may include other signal values 210-218 that are not included in the IDSD values 220, or may lack other signal values 210-218. Alternatively, the telemetry data 200 may include only the IDSD values 220.

In this example, the identifying signals are selected such that the IDSD values 220 are expected to uniquely identify the particular one of the client computing devices 102-104 and/or a particular user on the particular one of the client computing devices 102-104. In some examples, the IDSD values 202-208 are collected for identifying signals that are expected to be static and/or infrequently changing on the one of the client computing devices 102-104, such as a display size, an operating system type, and/or another static or infrequently changing signal.

When an infrequently changing signal is used, a transaction by the same one of the client computing devices 102-104 may still have telemetry data that generates a different newer IDSD than a prior transaction. However, since the change in IDSD is expected to happen infrequently in this example, it may not be critical to identify each prior transaction and the different IDSD involving the one of the client computing devices 102-104. For example, when a security score is used to bypass additional authentication measures, it may not be critical to identify each prior transaction and the different IDSDs involving the one of the client computing devices 102-104 and may be sufficient to rely on the transaction history of the newer IDSD involving the one of the client computing devices 102-104

The security server system 130 uses the generated IDSD to determine or otherwise identify any corresponding portions in the stored telemetry data that represent matching telemetry data from the same one of the client computing devices 102-104. In some examples, the IDSD is generated from one or more of the unprocessed IDSD values 220 for the identifying signals, although the IDSD can be generated from other data in other manners. Alternatively and/or in addition, the IDSD may be determined in other examples by processing the IDSD values 220. For example, a deterministic function, such as a hash or another function may be applied to the IDSD values 220 to generate the IDSD, although again other manners for generating IDSD can be used. In some examples, the telemetry database component 136 stores processed IDSDs in the telemetry data set in association with corresponding portions of the telemetry data.

The identifying signals may be configured to distinguish different client computing devices 102-104 with a high probability. That is, in some cases, a different client computing devices 102-104 may generate telemetry data with the same IDSD. The identifying signals may also be selected so that the IDSD distinguishes a characteristic other than the one of the client computing devices 102-104 associated with the telemetry data. For example, the identifying signals may be selected to generate an IDSD that distinguishes a particular individual or user on one of the client computing devices 102-104, or the particular individual or user on any client computing device. The examples described herein with respect to security scoring for particular client computing devices may be adapted to perform security scoring for particular users and/or individuals.

In some examples, the identifying signals are selected to generate an IDSD that classifies a set of similarly-configured client computing devices. In this case, the matching telemetry data may be used to generate a probabilistic value that is based on aggregate data from similarly-configured devices.

Matching Telemetry Data

Telemetry data from two transactions will match when the same IDSD is generated from the telemetry data for each transaction. For example, after a specific IDSD is generated from telemetry data received from a one of the client computing devices 102-104, the security server system (e.g. Security server system 130) identifies matching telemetry data in the stored telemetry data that includes telemetry data for one or more transactions that also have the same specific IDSD. In some examples, the identifying signals are selected so that telemetry data generated at the same one of the client computing devices 102-104 in different transactions will have the same IDSD. For example, the matching telemetry data may include one or more prior transactions with the same web server system (e.g. web server system 112) and/or one or more prior transactions with another web server system (e.g. web server system 114). A security server system 130 may use an IDSD generated based on telemetry data for a first transaction involving the one of the client computing devices 102-104 to identify matching telemetry data for one or more associated transactions involving the same one of the client computing devices 102-104. The IDSD of matching telemetry data of each corresponding transaction matches the IDSD generated based on the telemetry data collected during the first transaction.

Figure 2B:
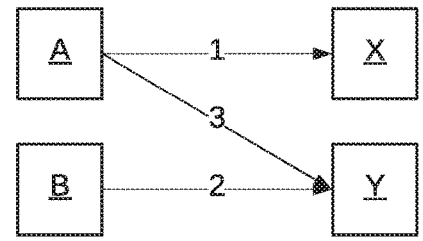
FIG. 2B is a partial block and partial functional block diagram of an example of stored telemetry data set including stored IDSD values.
Figure 2B:
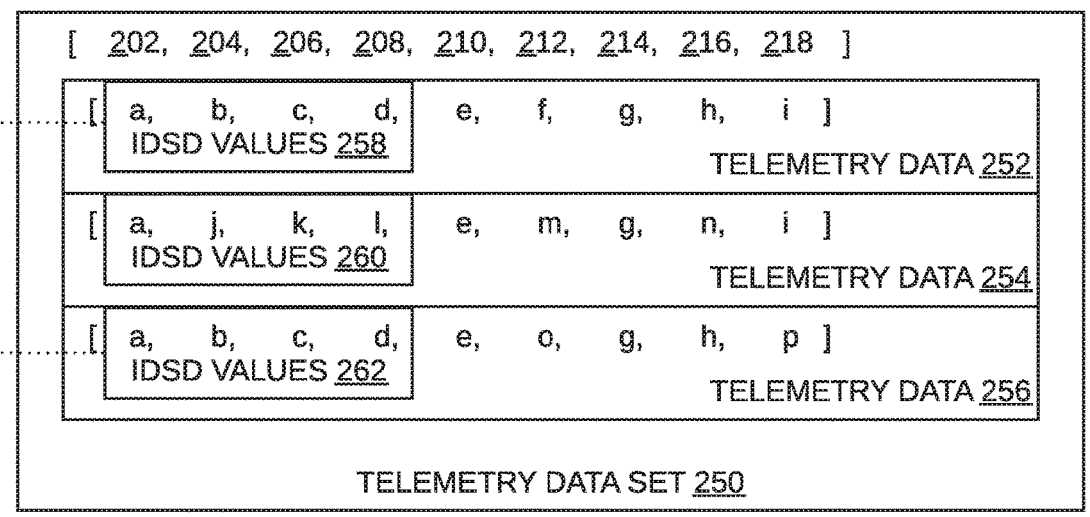

Referring to FIG. 2B a diagram of an example of stored telemetry data set including stored IDSD values is illustrated. The telemetry data set 250 includes telemetry data for three requests. Request 1 is from Client Device A, such as one of the client computing devices 102-104, to Web Server System X, such as one of the web server systems 112-114, during a first transaction. Request 2 is from Client Device B, such as another one of the client computing devices 102-104, to Web Server System Y, such as another one of the web server systems 112-114, during a second transaction. Request 3 is from Client Device A to Web Server System Y during a third transaction. Client A submitted telemetry data 252 in association with Request 1. Client B submitted telemetry data 254 in association with Request 2. Client A submitted telemetry data 256 in association with Request 3.

The telemetry data 252-256 for the transactions illustrated each include signal values for nine signals, of which four signals are identifying signals. Each of telemetry data 252-256 also includes IDSD values 258-262 for the four identifying signals. IDSD values 258 and IDSD values 262 match because telemetry data 252 and telemetry data 256 were both generated at Client Device A. The IDSD values 260 generated at Client Device B differ from the IDSD values 258 and 262 generated at Client Device A.

For example, if a security server system 130 receives fourth telemetry data generated at Client Device A for a fourth transaction, the IDSD values would be [a, b, c, d]. When the security server system 130 generates an IDSD based on the IDSD values in the fourth telemetry data, then the IDSD would match the IDSD for telemetry data 252 and telemetry data 256. For the fourth transaction, the security server system 130 will identify telemetry data 252 and telemetry data 256 as matching telemetry data. The security server system 130 will generate a security score for the fourth transaction and/or Client Device A based on the matching telemetry data (telemetry data 252 and telemetry data 256).

Security Score

The security server system 130 generates, calculates, or otherwise determines a security score for the one of the client computing devices 102-104 in a current transaction between a particular one of the client computing devices 102-104 and a particular one of the web server systems 112-114 based on the matching telemetry data. In this example, the matching telemetry data in the stored telemetry data set has an IDSD that matches the IDSD of the telemetry data collected at the one of the client computing devices 102-104 during the current transaction. This matching telemetry data serves as data about a prior transaction history of the one of the client computing devices 102-104, including multi-domain telemetry data collected during one or more transactions with other web server systems (e.g. web server system 114).

In some examples, the security score is based on a number of valid transactions of the one or more associated transactions that were not associated with any attack. The security score may also be based on a timing of the valid transactions. For example, more recent valid transactions may be given more weight than less recent valid transactions. In some examples, the telemetry data set 250 is limited by time. For example, the matching telemetry data may be limited to recent telemetry data, such as telemetry data collected in the last N weeks.

In some examples, the security score is based on whether the one or more associated transactions involving the one of the client computing devices 102-104 were associated with any attack on any of the plurality of web server systems 112-114. For example, the security server system 130 may use the matching telemetry data and/or other data stored for the associated transactions to determine whether the other transactions were involved in an attack. In some examples, the security server system 130 uses the telemetry data to determine whether the one of the client computing devices 102-104 was controlled by automated and/or malicious software in the other transactions. When the one or more associated transactions indicate that the one of the client computing devices 102-104 is associated with a prior attack, the security score is negatively affected. In some examples, a prior determination regarding whether the telemetry data indicates an attack is made and stored with the telemetry data. In this case, the prior determination may be used to facilitate determination of the security score.

The security server system 130 provides the security score to one of the web server systems 112-114. For example, the security score may be a value in a range of possible values, such as a decimal value from 0 to 1, a value in another numeric range, or the like. The one of the web server systems 112-114 may use the security score to determine how to respond to the one of the client computing devices 102-104 during a transaction. For example, the one of the web server systems 112-114 may use the security score to bypass an additional authentication procedure when the security score meets a threshold or another rule that indicates that a sufficient confidence in the identity of a user of the one of the client computing devices 102-104.

In some examples, the security score includes a recommendation, a classification, an indication, or another non-continuous value. For example, the security server system 130 may provide the one of the web server systems 112-114 an indication that the security score does or does not meet a threshold to bypass an additional authentication procedure, or another rule that indicates that a sufficient confidence in the identity of a user of the one of the client computing devices 102-104. In some examples, the security server system 130 may modify the threshold or other rule for determining whether to bypass an additional authentication procedure.

Security Score as Additional Authentication Measure

In some examples, the security score may be used to streamline user authentication, such as to bypass one or more additional authentication measures. For example, the security score may include a confidence value in an identity of a user of the one of the client computing devices 102-104. In some examples, the matching telemetry data is for one or more associated transactions that include authenticating the user of the one of the client computing devices 102-104, including an authentication of the user with a second web server system 114. Thus, the prior authentication history of the user of the client computing device across multiple domains may serve as an additional measure of security, such as an additional authentication factor.

When a sufficient security score serves as an additional authentication factor, the user may provide less authentication factors during multi-factor authentication. For example, in two-factor authentication, the user may provide only one authentication factor, such as the user's credentials (e.g. username and password). From the user's point of view, the user does not have to enter an additional authentication factor, making the user experience more streamlined. A sufficient security score may be used as an additional authentication factor in other authentication protocols. In some examples, the security score is used to allow a user to bypass an additional authentication measure comprising a challenge-response test that differentiates human users from automated software that is mimicking a human, such as a CAPTCHA.

Security Server System Implementation Example

Figure 3:
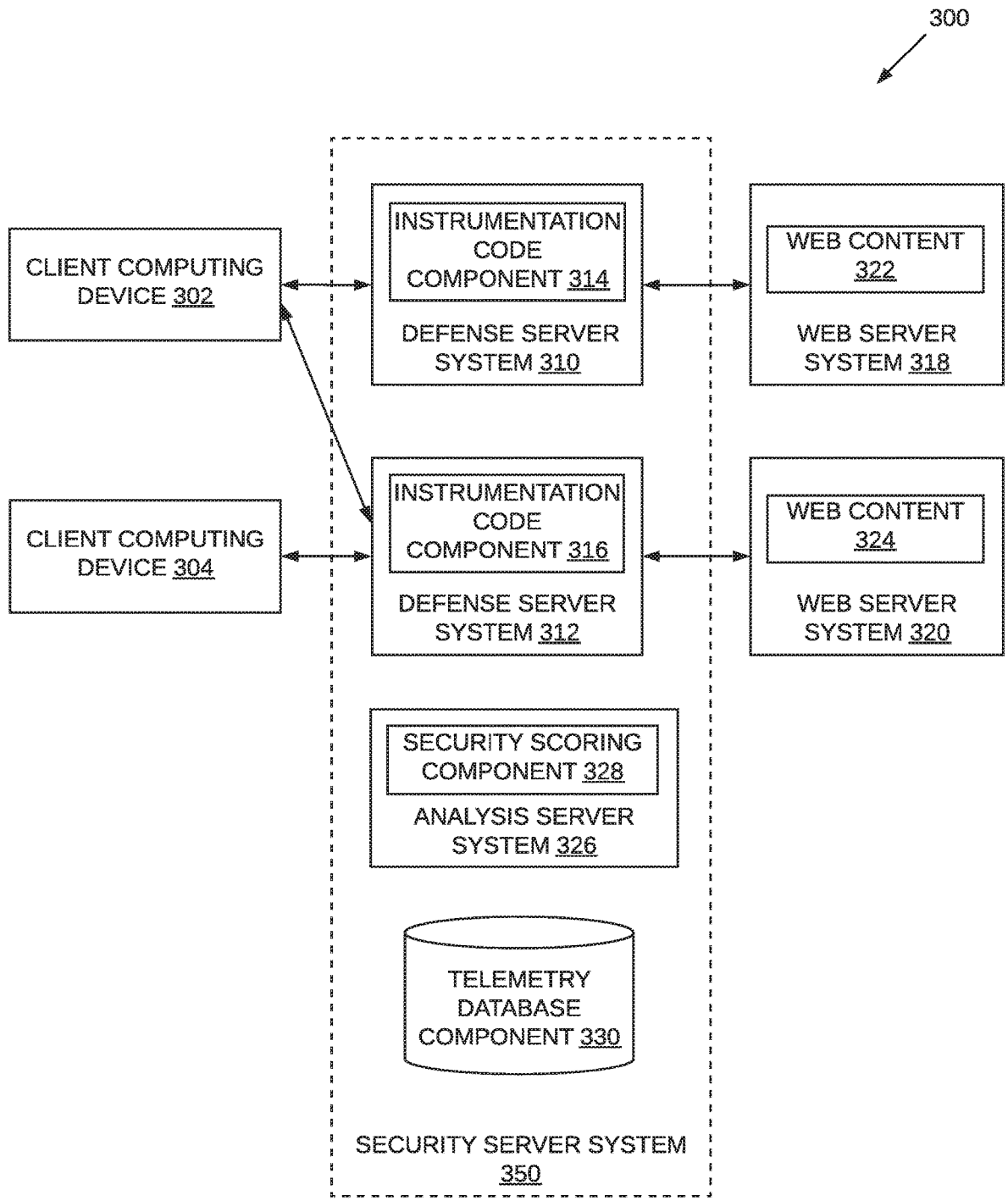
FIG. 3 is a block diagram of another computer system including another example of a security server system.

Referring to FIG. 3, a diagram of another computer system 300 that includes a plurality of client computing device 302-304, a plurality of web server systems 318-320, and a security server system 350 is illustrated, although the computer system may have other types and/or numbers of other systems, devices, components and/or other elements in other configurations. In this example, the security server system 350 includes a plurality of defense server systems 310-312, an analysis server system 326, and a telemetry database component 330, although the security server system could comprise other types and/or numbers of other systems, devices, components, and/or other elements in other configurations.

In this example, the defense server systems 310-312 each include an instrumentation code component 314-316, although one or more of the defense server systems could comprise other types and/or numbers of other components, modules, programmed instructions and/or other data. In this example, each defense server system 310-312 is configured to provide instrumentation code to or more client computing devices 302-304 that request web content 322-324 from one or more web server systems 318-320. In some examples, the defense server systems 318-320 detect and mitigate attacks for one or more web server systems 318-320. For example, the defense server systems 310-312 may evaluate telemetry data collected at the client computing device 302-304 to detect automated transactions initiated by malicious software executing on client computing devices 302-304. The defense server systems 310-312 may detect and mitigate such attacks in real time based on the telemetry data. The defense server systems 310-312 provide the telemetry data to the telemetry database component 330, making the telemetry data available to the security scoring component 328.

In this example, the analysis server system 326 of the security server system 350 includes the security scoring component 328, although the analysis server system 326 could comprise other types and/or numbers of other components, modules, programmed instructions and/or other data. The analysis server system 326 accesses the telemetry data set for security scoring via the telemetry database component 330. In some examples, the analysis server system 326 also uses the telemetry data set to learn about new attacks and deploy new countermeasures for real-time attack detection and prevention. For example, the analysis server system 326 may analyze telemetry data offline to generate a new security countermeasure. The analysis server system 326 may provide the new security countermeasure to the defense server systems 310-312 so that the defense server systems 310-312 may use the new security countermeasure online to process transactions in real time.

In some examples, a particular defense server system 310 is deployed as a reverse proxy for a particular web server system 318. As a reverse proxy, the defense server system 310 retrieves resources, such as web content 322, on behalf of clients of the web server system 318, such as client computing device 302. To the client computing device 302, the web content 322 appears to originate from the web server system 318. The defense server system 310 may be deployed locally to the web server system 318 or deployed over the Internet with respect to the web server system 318, such as in a cloud computing system managed by a security company, and/or in a computer system operated by a security company.

Figure 4:
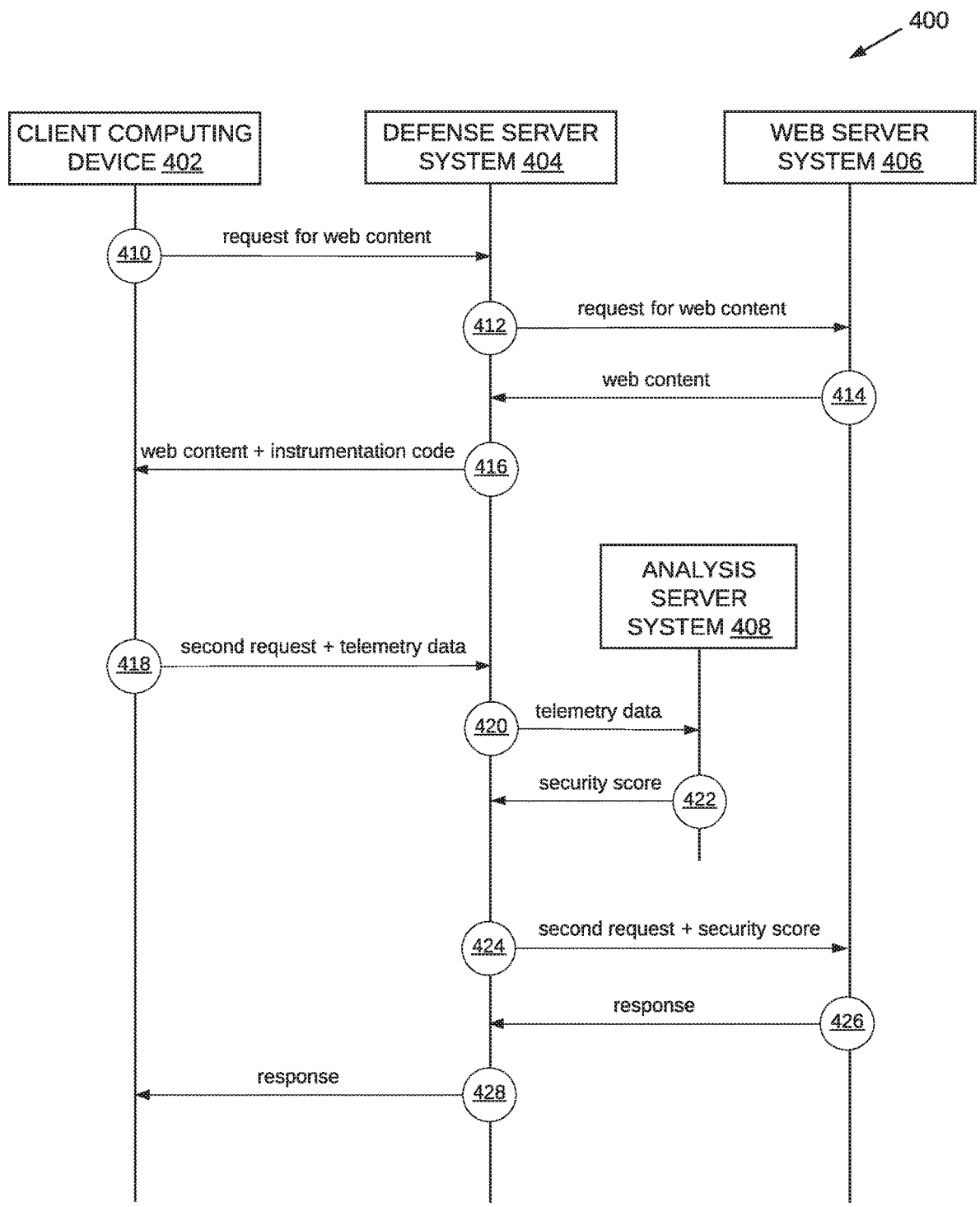
FIG. 4 is a sequence diagram of an example of a method for security scoring based on multi-domain telemetry data that utilizes an in-line defense server system.

In some examples, a defense server system 310 that acts as a reverse proxy is deployed as an in-line defense server system, which is described in greater detail with respect to FIG. 4.

In-Line Defense Server System Example

Referring to FIG. 4, a sequence diagram of an example of a method for security scoring based on multi-domain telemetry data that in this example utilizes an in-line defense server system is illustrated. In this example, the method 400 involves a client computing device 402, a defense server system 404, a web server system 406, and an analysis server system 408, although the method may use other types and/or numbers of other systems, devices, components and/or other elements. The defense server system 404 and the analysis server system 408 belong to a security server system which is like for example the security server system 130 illustrated and described with reference to FIG. 1 or the security server system 350 illustrated and described with reference to FIG. 3. In this example, the security server system discussed in FIG. 4 is the same in structure and operation as security system 350, except as otherwise illustrated and described by way of the examples herein. In this example, the defense server system 404 is positioned in the network as an in-line device, although the defense server system may be in other configurations. In the in-line defense server configuration, requests from the client computing device 402 are transmitted to the defense server system 404, which forwards valid requests to the web server system 406 in this example.

At step 410, the client computing device 402 initiates a request directed to the web server system 406. The request is initially handled by the defense server system 404. At step 412, the defense server system 404 forwards the request to the web server system 406. At step 414, the web server system 406 provides the web content to the defense server system 404. At step 416, the defense server system 404 provides the web content and instrumentation code to the client computing device 402.

At step 418, the client computing device 402 initiates a second request. In some examples, the second request is initiated based on interaction with the web content at the client computing device 402. The request is initially handled by the defense server system 404. In some examples, the defense server system 404 rejects requests that are not sent with telemetry data when telemetry data is expected. At step 420, the defense server system 404 submits the telemetry data to the analysis server system 408. The analysis server system 408 generates a security score for the client computing device 402 based on the telemetry data, such as by determining an IDSD that identifies the client computing device, identifying any matching telemetry data in the stored telemetry data set for transactions involving the client computing device, and generating the security score. At step 422, the analysis server system 408 provides the security score to the defense server system 404, although other data may be provided, such as any identified matching telemetry data.

At step 424, in this example the defense server system 404 forwards the second request and provides the security score to the web server system 406 to determine whether the second request is part of an attack based on the telemetry data or for other processing. In some examples, the defense server system 404 determines whether the second request is part of an attack based on the telemetry data, and only forwards the second request when the second request is not part of an attack.

At step 426, the web server system 406 provides a response to the second request. At step 428, the defense server system 404 provides the response to the client computing device 402. In some examples, the response is based on the security score. For example, the response from the web server system 406 may allow the client computing device 402 to bypass an additional authentication procedure based on a determination by the web server system 406, the analysis server system 408, and/or the defense server system 404, where the determination is made based on the security score.

Out-of-Band Defense Server System Example

Figure 5:
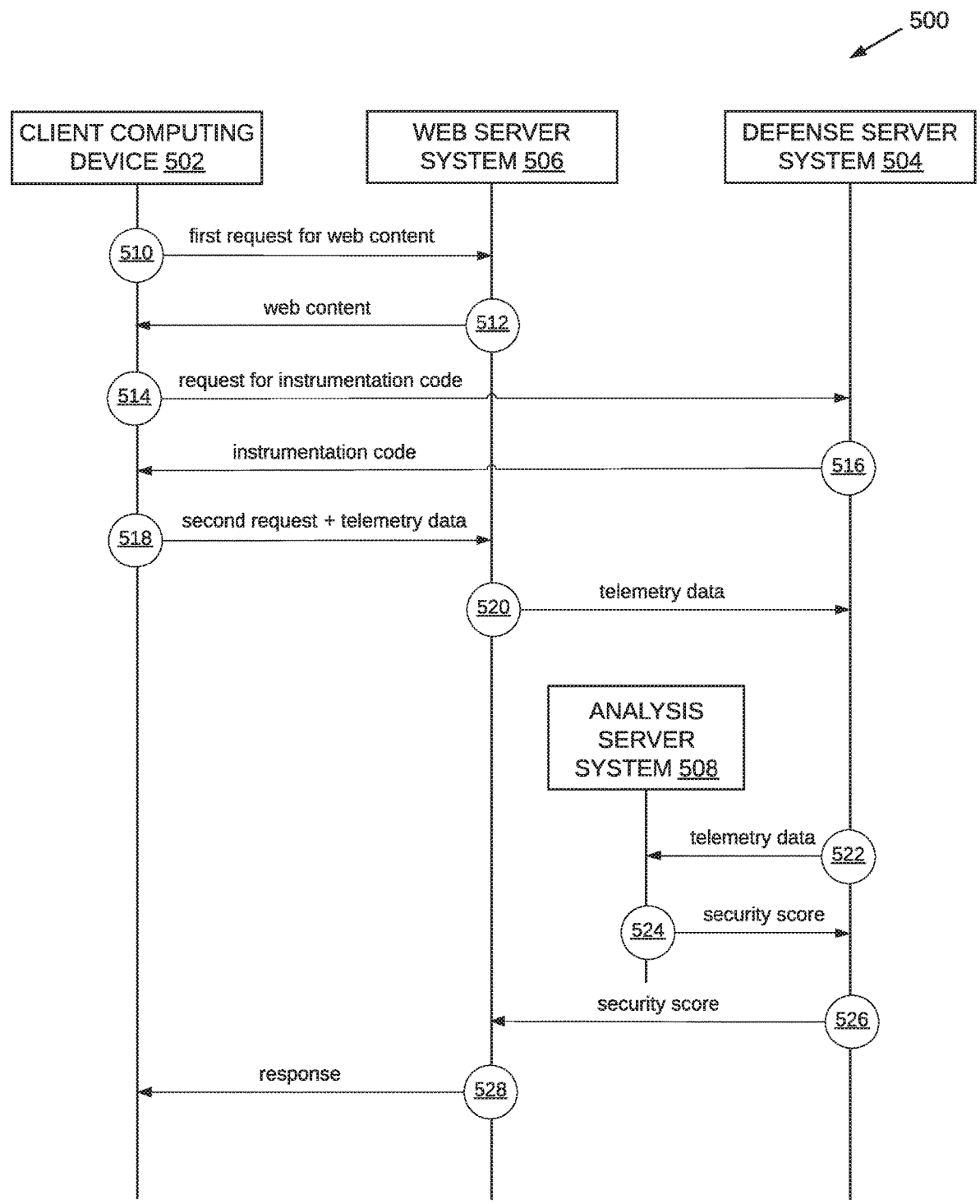
FIG. 5 is a sequence diagram of an example of a method for security scoring based on multi-domain telemetry data that utilizes an out-of-band defense server system.

Referring to FIG. 5, a sequence diagram of an example of a method for security scoring based on multi-domain telemetry data in an example that utilizes an out-of-band defense server system is illustrated. In this example, the method 500 involves a client computing device 502, a defense server system 504, a web server system 506, and an analysis server system 508, although the method may use other types and/or numbers of other systems, devices, components and/or other elements. The defense server system 504 and the analysis server system 508 belong to a security server system which is like for example the security server system 130 illustrated and described with reference to FIG. 1 or the security server system 350 illustrated and described with reference to FIG. 3. In this example, the security server system discussed in FIG. 5 is the same in structure and operation as security system 350, except as otherwise illustrated and described by way of the examples herein, such as with the alternate configuration of the web server system 506 and defense server system 504. In this example, the defense server system 504 is positioned in the network as an out-of-band device, although the defense server system may be in other configurations. In this out-of-band defense server configuration, requests from the client computing device 502 are transmitted directly to the web server system 506.

At step 510, the client computing device 502 requests web content from the web server system 506. At step 512, the web server system 506 provides the web content to the client computing device 502. At step 514, client computing device 502 requests the instrumentation code from the defense server system 504. At step 516, the defense server system 504 provides the instrumentation code to the client computing device 502, although other manners for the client computing device 502 to obtain the code may be used.

At step 518, the client computing device 502 transmits, to the web server system 506, a second request and telemetry data generated at the client computing device 502 when the provided instrumentation code executes at the client computing device 502. At step 520, the web server system 506 transmits the telemetry data to the defense server system 504. In some examples, the defense server system 504 determines whether the second request is part of an attack based on the telemetry data and notifies the web server system 506 when the second request is part of an attack, allowing the web server system 506 to determine whether to respond to the second request, although the processing and determination can be done in other manners.

At step 522, the defense server system 504 submits the telemetry data to the analysis server system 508. The analysis server system 508 generates a security score for the client computing device 502 based on the telemetry data, such as by determining an IDSD that identifies the client computing device, identifying any matching telemetry data in the stored telemetry data set for transactions involving the client computing device, and generating the security score At step 524, the analysis server system 508 provides the security score to the defense server system 504. At step 526, the defense server system 504 provides the security score to the web server system 506. At step 528, the web server system 506 provides a response to the second request depending on whether the security score indicates an attack or other issue in this example. At step 528, the defense server system 504 provides the response to the client computing device 502. In some examples, the response is based on the security score. For example, the response from the web server system 506 may allow the client computing device 502 to bypass an additional authentication procedure for the second request based on a determination by the web server system 506, the analysis server system 508, and/or the defense server system 504, although other types of action(s) may be taken based on the determined security score, such as requiring additional authentication or denying the request by way of example.

The in-line and out-of-band network configurations are provided as examples and other network configurations may be used to implement security scoring based on multi-domain telemetry data in accordance with the examples illustrated and described herein. For example, one or more transactions or other communications between a client computing device and a web server system may occur without involvement of an in-line or out-of-band defense server system. In some examples, a security system handles requests corresponding to the in-line security server configuration as well as requests corresponding to the out-of-band security server configuration. For example, the system may include one or more in-line defense server systems and one or more out-of-band security server systems. Alternatively and/or in addition, the system may include a security server that is capable of handling both requests corresponding to the in-line security server configuration as well as requests corresponding to the out-of-band security server configuration.

Delayed Security Scoring

As described above, the security server system (e.g. security server system 130) may receive telemetry data in association with a request (e.g. the second request in FIGS. 4-5) from a client computing device (e.g. one of the client computing devices 102-104). Based on the security score, the web server system (e.g. web server system 112) may modify a response to the request based on the security score provided by the security server system 130, although other types of actions with respect to the response may be executed, such as requiring additional authentication or denying the request by way of example.

In some examples, the security server system 130 provides the security score at a later time. For example, the security server system 130 may provide the security score only when the one of the web server systems 112-114 requests the security score. Alternatively and/or in addition, the security server system 130 may provide the security score after the one of the web server systems 112-114 has provided the one of the client computing devices 102-104 a response to the request. When the one of the web server systems 112-114 has already provided a response to the request, the one of the web server systems 112-114 may modify the original response, such as in a subsequent communication to the one of the client computing devices 102-104.

Figure 6:
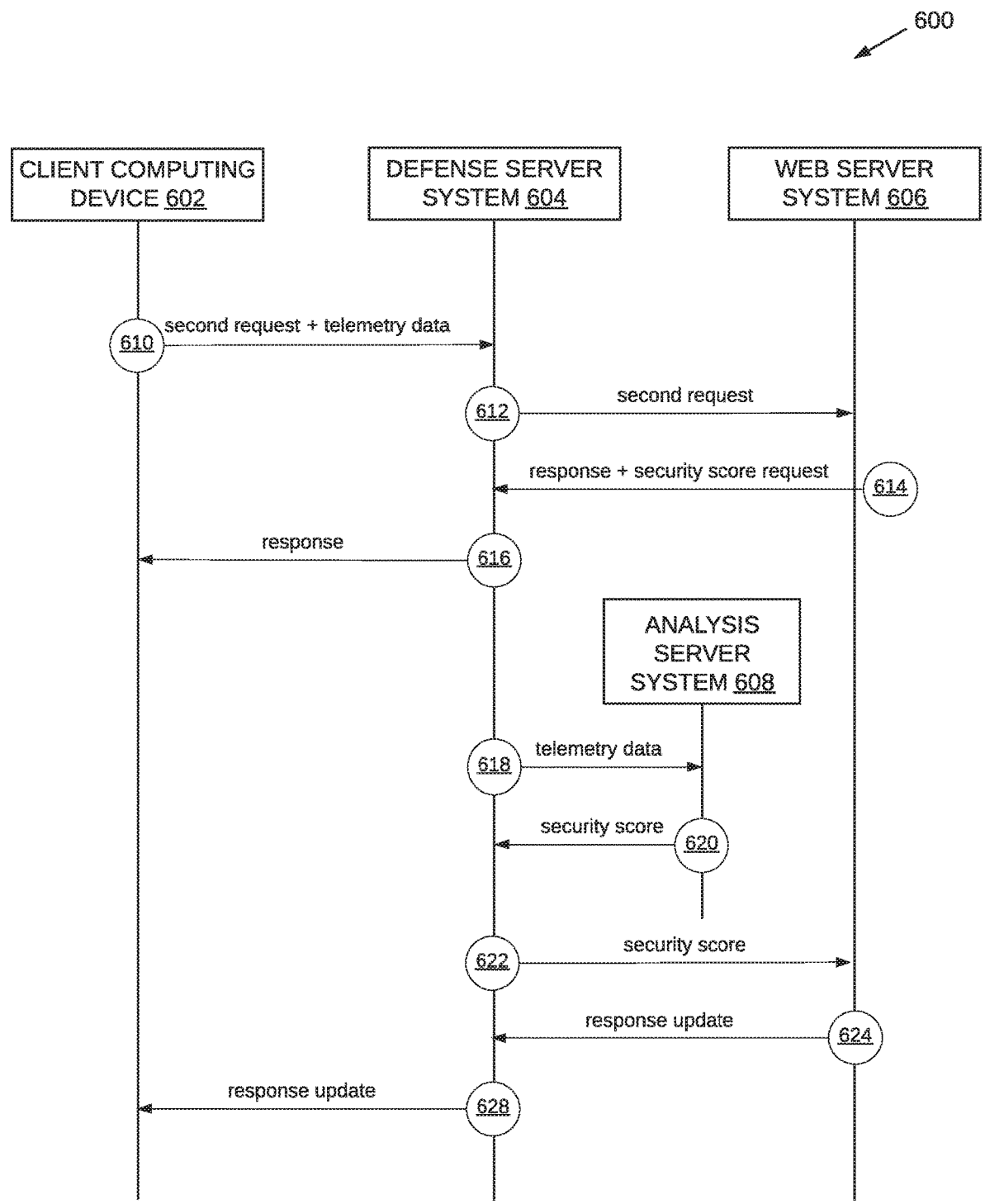
FIG. 6 is a sequence diagram of an example of a method for security scoring with delayed security scoring.

Referring to FIG. 6, a sequence diagram of an example of a method for security scoring with delayed security scoring in an example is illustrated. In this example, the method 600 involves a client computing device 602, a defense server system 604, a web server system 606, and an analysis server system 608, although the method may use other types and/or numbers of other systems, devices, components, and/or other elements. The defense server system 604 and the analysis server system 608 belong to a security server system which is like for example the security server system 130 illustrated and described with reference to FIG. 1 or the security server system 350 illustrated and described with reference to FIG. 3. In this example, the security server system discussed in FIG. 6 is the same in structure and operation as security system 350, except as otherwise illustrated and described by way of the examples herein. The example method 600 is shown with respect to a computer system with an in-line defense server system 604, although the example shown in method 600 may be adapted to another configuration without departing from the spirit and the scope of the disclosure.

In this example, the method 600 begins after the client computing device 602 has received and executes instrumentation code that collects telemetry data at the client computing device 602 that accompany a request. At step 610, the client computing device 602 sends a second request along with telemetry data to the defense server system 604. At step 612, the defense server system 604 forwards the second request to the web server system 606. In some examples, the defense server system 604 forwards the second request after determining that the second request is not part of an attack based on the telemetry data of step 610, for example in a manner illustrated and described with examples herein.

At step 614, in this example the web server system 606 provides a response and a security score request to the defense server system 604. Alternatively, the security score may be requested in a subsequent step. At step 616, the defense server 604 forwards the response to the client computing device 602. By way of example, this initial response may comprise a first portion of permitted content, but the potential full response may comprise other secure content which requires confirmation of additional authentication before being provided.

At step 618, the defense server system 604 sends the telemetry data to the analysis server system 606. In some examples, the defense server system 604 sends an IDSD generated based on the telemetry data. Alternatively, the defense server system 604 may provide the IDSD to the web server system 606, allowing the web server system 606 to directly request the security score from the analysis server system 608. At step 620, the defense server system 604 sends the security score to the defense server system 604.

At step 622, the defense server system 604 provides the security score to the web server system 606 to allow the web server system 604 to modify a response to the second request based on the security score. For example, if the security score meets a stored or otherwise set threshold or other benchmark to bypass an additional authentication procedure, then the web server system 604 may choose to display secure content for the authorized user. At step 624, the web server system 606 provides a response update to the original response provided to the client computing device 602 at steps 614-616.

At step 628, the defense server system 604 provides the response update to the client computing device. For example, the response at step 616 may cause a browser to render a web page at the client computing device 602, and the response update may cause the browser to render additional secure content in the web page.

Example Methods

Figure 7:
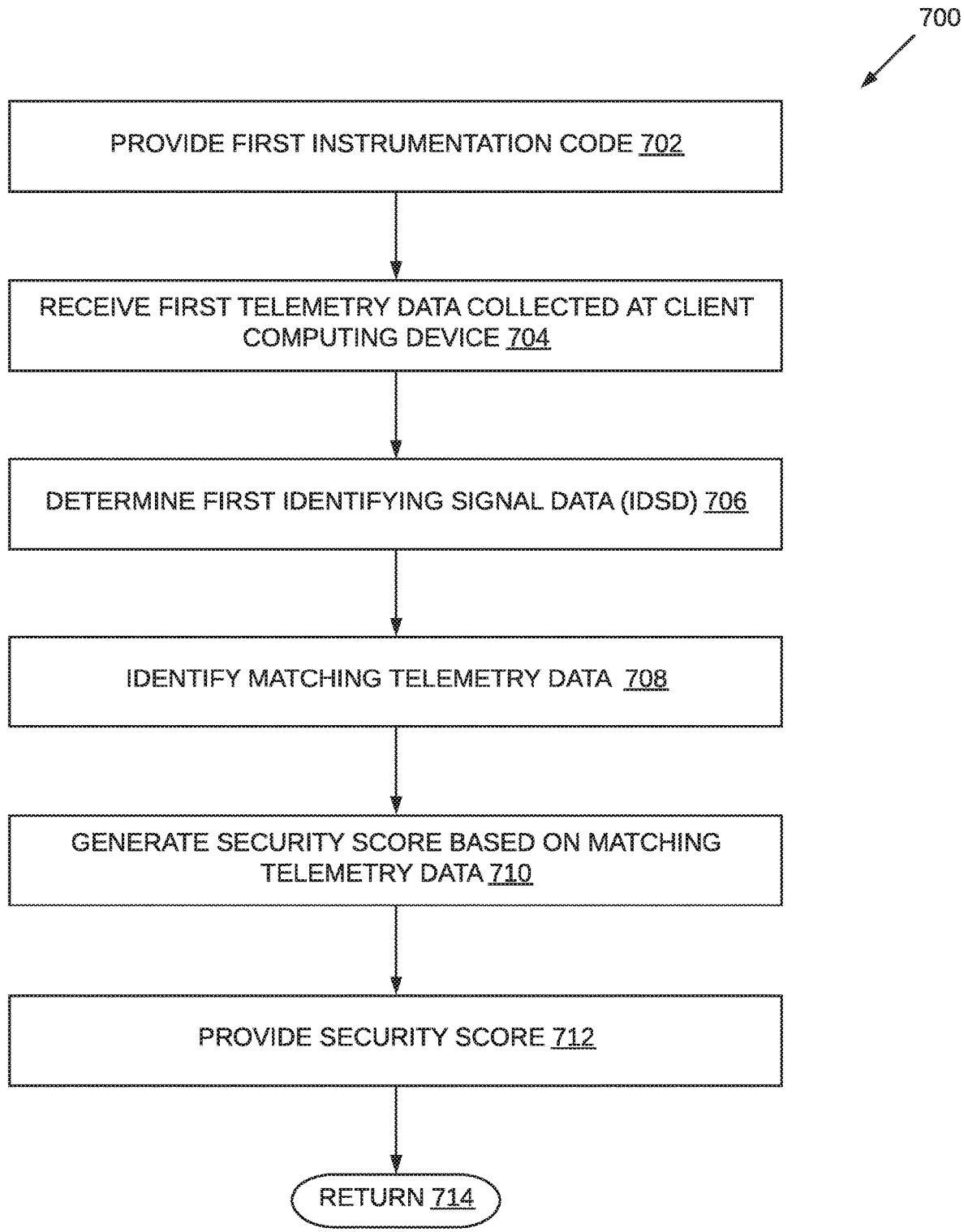
FIG. 7 is a flow chart of another example of a method for security scoring with delayed security scoring.

Referring to FIG. 7, a flow diagram of an example of a method for security scoring with delayed security scoring is illustrated. In this example, the method 700 may be performed by one or more computing devices and/or processes thereof, such as those illustrated and described by way of the examples herein. For example, one or more blocks of method 700 may be performed by a computer system, such as but not limited to computer system 800. In some examples, one or more blocks of method 700 are performed by a security server system, which may include one or more defense server systems and/or analysis server systems, such as one of the security server systems described with reference to FIGS. 1 and 3-6 by way of example only. In this example, method 700 will be described with respect to security server system 130, but is not limited to performance by such.

At block 702, the security server system 130 provides first instrumentation code for one of the client computing devices 102-104. The first instrumentation code may be provided in response to the one of the client computing devices 102-104 interacting with a first web server system in a first transaction. For example, the first instrumentation code may be provided in response to the one of the client computing devices 102-104 requesting first web content from the one of the web server systems 112-114.

At block 704, the security server system 130 receives first telemetry data from the one of the client computing devices 102-104. The first telemetry data is collected at the one of the client computing devices 102-104 when the first instrumentation code is executed at the one of the client computing devices 102-104. For example, the security server system 130 receives the first telemetry data directly from the one of the client computing devices or from the one of the web server systems 112-114 as illustrated and described in the examples herein. In some examples, the first telemetry data is transmitted by the one of the client computing devices 102-104 with a second request that is generated based on interaction with the first web content when the first web content executes at the one of the client computing devices 102-104. For example, the first web content may be a login page, and the second request may be a login request to authenticate a user on the one of the client computing devices 102-104.

At block 706, the security server system 130 determines first identifying signal data (IDSD) based on the telemetry data. The first IDSD is usable to identify the client computing device. The IDSD may be based on a set of IDSD values in that telemetry data for identifying signals. In some examples, the first IDSD is generated by processing signal values for particular signals in the first telemetry data. The first IDSD may also be the unprocessed IDSD values.

At block 708, the security server system 130 identifies matching telemetry data in a stored telemetry data set for a plurality of transactions between a plurality of client computing devices 102-104 and a plurality of web server systems 112-114. The matching telemetry data includes telemetry data for one or more associated transactions where the telemetry data has IDSD matching the first IDSD. For example, the one or more associated transactions may include other transactions involving the client computing device. In this example, the one or more associated transactions include a second transaction between the one of the client computing devices 102-104 and another one of the web server systems 112-114.

At block 710, the security server system 130 determines a security score based on the matching telemetry data. In some examples, the security score indicates a confidence level in an identity of a user of the one of the client computing devices 102-104. In some examples, determining the security score includes determining whether the at least one transaction involving the one of the client computing devices 102-104 was associated with an attack based on the matching telemetry data and/or a number of valid transactions that were not associated with any attack. The security score may be a value in a range of possible values, such as a decimal value from 0 to 1, a value in another numeric range, or the like. In some examples, the security score includes a recommendation, a classification, an indication, or another non-continuous value.

At block 712, the security server system 130 provides the security score to the one of the web server systems 112-114. The one of the web server systems 112-114 may use the security score to determine how to respond to the one of the client computing devices 102-104 during the transaction. For example, the one of the web server systems 112-114 may use the security score to bypass an additional authentication procedure when the security score meets a threshold or another rule.

At block 714, method 700 returns and/or terminates. For example, method 700 may pass control to a calling process, generate any appropriate record or notification, return after a method or function invocation, process a next operation requested by a client device, or terminate.

Implementation Mechanisms—Hardware Overview

According to one example, the techniques described herein are implemented by one or more special-purpose computing systems or devices and one or more of the systems or devices may be configured to operate in a virtual environment. The special-purpose computing devices may be hard-wired to perform one or more techniques described herein, including combinations thereof. Alternatively and/or in addition, the one or more special-purpose computing devices may include digital electronic devices such as one or more application-specific integrated circuits (ASICs) or field programmable gate arrays (FPGAs) that are persistently programmed to perform the techniques. Alternatively and/or in addition, the one or more special-purpose computing devices may include one or more general purpose hardware processors programmed to perform the techniques described herein pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices and/or any other device that incorporates hard-wired or program logic to implement the techniques.

Figure 8:
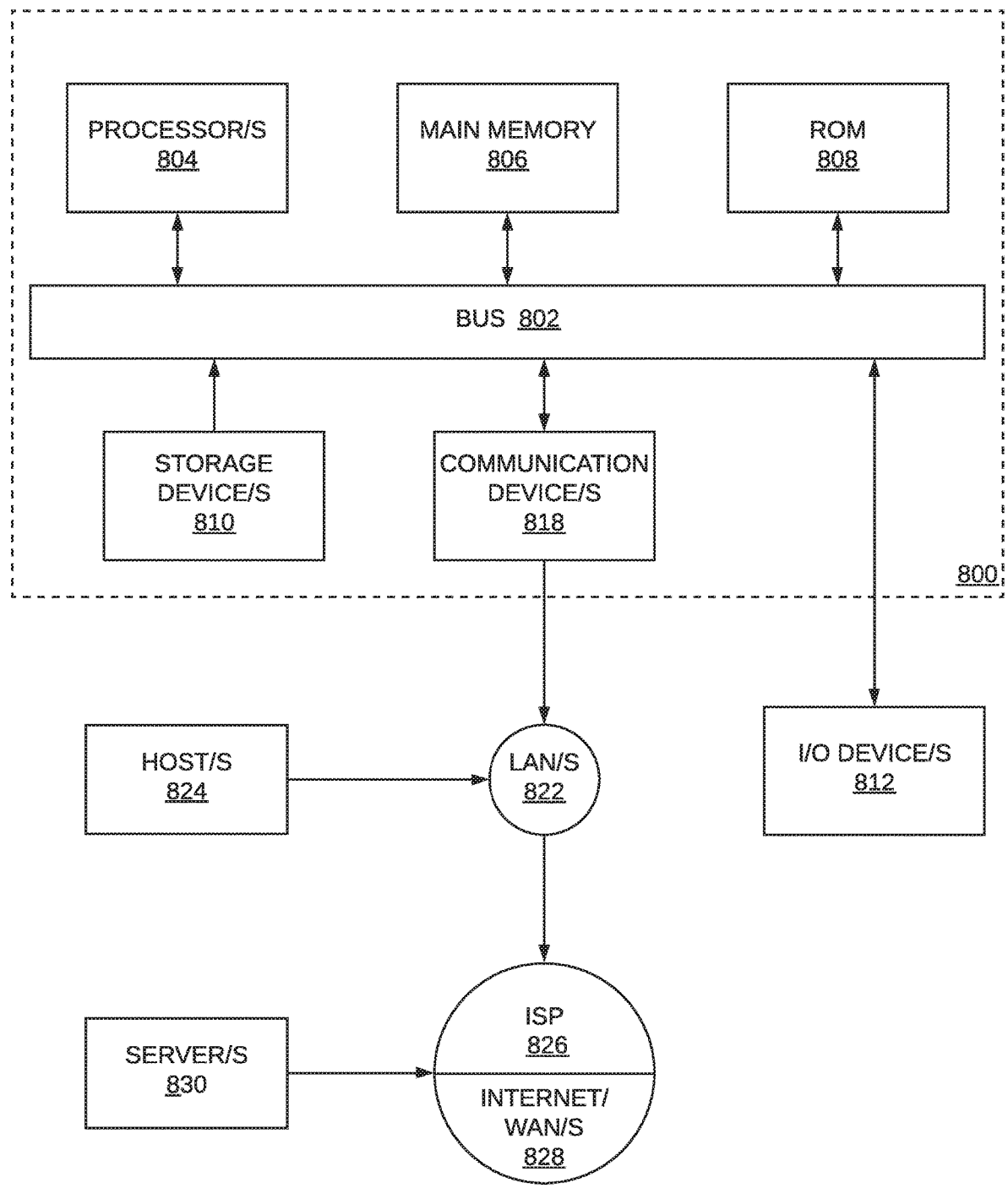
FIG. 8 is a block diagram of an example of a computer system.

Referring to FIG. 8, a computer system upon which one or more of the examples of the systems and devices may be implemented is illustrated. In this example, the computer system 800 includes a bus 802 or other communication mechanism for communicating information, and one or more hardware processors 804 coupled with bus 802 for processing information, such as basic computer instructions and data. Hardware processor(s) 804 may include, for example, one or more general-purpose microprocessors, graphical processing units (GPUs), coprocessors, central processing units (CPUs), and/or other hardware processing units.

Computer system 800 also includes one or more units of main memory 806 coupled to bus 802, such as random access memory (RAM) or other dynamic storage, for storing information and instructions to be executed by processor(s) 804. Main memory 806 may also be used for storing temporary variables or other intermediate information during execution of instructions to be executed by processor(s) 804. Such instructions, when stored in non-transitory storage media accessible to processor(s) 804, turn computer system 800 into a special-purpose machine that is customized to perform the operations specified in the instructions. In some examples, main memory 806 may include dynamic random-access memory (DRAM) (including but not limited to double data rate synchronous dynamic random-access memory (DDR SDRAM), thyristor random-access memory (T-RAM), zero-capacitor (Z-RAM™)) and/or non-volatile random-access memory (NVRAM).

Computer system 800 may further include one or more units of read-only memory (ROM) 808 or other static storage coupled to bus 802 for storing information and instructions for processor(s) 804 that are either always static or static in normal operation but reprogrammable. For example, ROM 808 may store firmware for computer system 800. ROM 808 may include mask ROM (MROM) or other hard-wired ROM storing purely static information, programmable read-only memory (PROM), erasable programmable read-only memory (EPROM), electrically-erasable programmable read-only memory (EEPROM), another hardware memory chip or cartridge, or any other read-only memory unit.

One or more storage devices 810, such as a magnetic disk or optical disk, is provided and coupled to bus 802 for storing information and/or instructions. Storage device(s) 810 may include non-volatile storage media such as, for example, read-only memory, optical disks (such as but not limited to compact discs (CDs), digital video discs (DVDs), Blu-ray discs (BDs)), magnetic disks, other magnetic media such as floppy disks and magnetic tape, solid state drives, flash memory, optical disks, one or more forms of non-volatile random access-memory (NVRAM), and/or other non-volatile storage media.

Computer system 800 may be coupled via bus 802 to one or more input/output (I/O) devices 812. For example, I/O device(s) 812 may include one or more displays for displaying information to a computer user, such as a cathode ray tube (CRT) display, a Liquid Crystal Display (LCD) display, a Light-Emitting Diode (LED) display, a projector, and/or any other type of display.

I/O device(s) 812 may also include one or more input devices, such as an alphanumeric keyboard and/or any other key pad device. The one or more input devices may also include one or more cursor control devices, such as a mouse, a trackball, a touch input device, or cursor direction keys for communicating direction information and command selections to processor 804 and for controlling cursor movement on another I/O device (e.g. a display). This input device typically has at degrees of freedom in two or more axes, (e.g. a first axis x, a second axis y, and optionally one or more additional axes z . . . ), that allows the device to specify positions in a plane. In some examples, the one or more I/O device(s) 812 may include a device with combined I/O functionality, such as a touch-enabled display.

Other I/O device(s) 812 may include a fingerprint reader, a scanner, an infrared (IR) device, an imaging device such as a camera or video recording device, a microphone, a speaker, an ambient light sensor, a pressure sensor, an accelerometer, a gyroscope, a magnetometer, another motion sensor, or any other device that can communicate signals, commands, and/or other information with processor(s) 804 over bus 802.

Computer system 800 may implement the techniques described herein using customized hard-wired logic, one or more ASICs or FPGAs, firmware or program logic which, in combination with the computer system causes or programs, causes computer system 800 to be a special-purpose machine. According to one example, the techniques herein are performed by computer system 800 in response to processor(s) 804 executing one or more sequences of one or more instructions contained in main memory 806. Such instructions may be read into main memory 806 from another storage medium, such as one or more storage device(s) 810. Execution of the sequences of instructions contained in main memory 806 causes processor(s) 804 to perform the method steps described herein. In alternative examples, hard-wired circuitry may be used in place of or in combination with software instructions.

Computer system 800 also includes one or more communication interfaces 818 coupled to bus 802. Communication interface(s) 818 provide two-way data communication over one or more physical or wireless network links 820 that are connected to a local network 822 and/or a wide area network (WAN), such as the Internet. For example, communication interface(s) 818 may include an integrated services digital network (ISDN) card, cable modem, satellite modem, or a modem to provide a data communication connection to a corresponding type of telephone line. Alternatively and/or in addition, communication interface(s) 818 may include one or more of: a local area network (LAN) device that provides a data communication connection to a compatible local network 822; a wireless local area network (WLAN) device that sends and receives wireless signals (such as electrical signals, electromagnetic signals, optical signals or other wireless signals representing various types of information) to a compatible LAN; a wireless wide area network (WWAN) device that sends and receives such signals over a cellular network access a wide area network (WAN, such as the Internet 828); and other networking devices that establish a communication channel between computer system 800 and one or more LANs 822 and/or WANs.

Network link(s) 820 typically provides data communication through one or more networks to other data devices. For example, network link(s) 820 may provide a connection through one or more local area networks 822 (LANs) to one or more host computers 824 or to data equipment operated by an Internet Service Provider (ISP) 826. ISP 826 in turn provides connectivity to one or more wide area networks 828, such as the Internet. LAN(s) 822 and WAN(s) 828 both use electrical, electromagnetic or optical signals that carry digital data streams. The signals through the various networks and the signals on network link(s) 820 and through communication interface(s) 818 are example forms of transmission media, or transitory media.

The term "storage media" as used herein refers to any non-transitory media that stores data and/or instructions that cause a machine to operate in a specific fashion, such as any of the instructions illustrated and described by way of the examples herein. Such storage media may include volatile and/or non-volatile media. Storage media is distinct from but may be used in conjunction with transmission media. Transmission media participates in transferring information between storage media. For example, transmission media includes coaxial cables, copper wire and fiber optics, including traces and/or other physical electrically conductive components that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its main memory 806 and send the instructions over a telecommunications line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 can send messages and receive data, including program code, through the network(s), network link 820 and communication interface 818. In the Internet example, one or more servers 830 might transmit signals corresponding to data or instructions requested for an application program executed by the computer system 800 through the Internet 828, ISP 826, local network 822 and a communication interface 818. The received signals may include instructions and/or information for execution and/or processing by processor(s) 804. Processor(s) 804 may execute and/or process the instructions and/or information upon receiving the signals by accessing main memory 806, or at a later time by storing them and then accessing them from storage device(s) 810.

Other Aspects of Disclosure

In the foregoing specification, examples of the technology have been described with reference to numerous specific details that may vary from implementation to implementation. The specification and drawings are, accordingly, to be regarded in an illustrative rather than a restrictive sense. The sole and exclusive indicator of the scope of the technology, and what is intended by the applicants to be the scope of the technology, is the literal and equivalent scope of the set of claims that issue from this application, in the specific form in which such claims issue, including any subsequent correction.

What is claimed is:

1. A method implemented by a network traffic management system comprising one or more network security devices, server devices, or client devices, the method comprising:
   receiving telemetry data collected based on instrumentation code executed at one of a plurality of client computing devices with a requested transaction with one of a plurality of web server systems;
   determining identifying signal data (IDSD) usable to identify the one of client computing devices based on the received telemetry data;
   identifying any matching telemetry data in a telemetry data set for a plurality of prior transactions between one or more of the client computing devices and one or more of the web server systems based on any stored IDSDs that match the received IDSD;
   generating a security score associated with the one of the client computing devices based on the identified matching telemetry data; and
   managing a response to the requested transaction to the one of client computing devices based on the generated security score.

2. The method of claim 1, wherein the security score comprises a confidence value in an identity of a user associated with the one of the client computing devices and the requested transaction.

3. The method of claim 1, wherein the security score comprises an indication that the security score meets a threshold to bypass an additional authentication procedure.

4. The method of claim 1, wherein the security score is based on whether any of the transactions associated with the identified matching telemetry data involving the one of the client computing devices were associated with any attack.

5. The method of claim 1, further comprising:
   providing the generated security score to the one of the web server systems for the requested transaction; and
   receiving an updated response to the requested transaction based on the generated security server from the one of the web server systems.

6. A non-transitory computer readable medium having stored thereon instructions for workload processing comprising executable code that, when executed by one or more processors, causes the one or more processors to:
   receive telemetry data collected based on instrumentation code executed at one of a plurality of client computing devices with a requested transaction with one of a plurality of web server systems;
   determine identifying signal data (IDSD) usable to identify the one of client computing devices based on the received telemetry data;
   identify any matching telemetry data in a telemetry data set for a plurality of prior transactions between one or more of the client computing devices and one or more of the web server systems based on any stored IDSDs that match the received IDSD;
   generate a security score associated with the one of the client computing devices based on the identified matching telemetry data; and
   manage a response to the requested transaction to the one of client computing devices based on the generated security score.

7. The medium of claim 6, wherein the security score comprises a confidence value in an identity of a user associated with the one of the client computing devices and the requested transaction.

8. The medium of claim 6, wherein the security score comprises an indication that the security score meets a threshold to bypass an additional authentication procedure.

9. The medium of claim 6, wherein the security score is based on whether any of the transactions associated with the identified matching telemetry data involving the one of the client computing devices were associated with any attack.

10. The medium of claim 6, wherein the executable code, when executed by the one or more processors further causes the one or more processors to:
    provide the generated security score to the one of the web server systems for the requested transaction; and
    receive an updated response to the requested transaction based on the generated security server from the one of the web server systems.

11. A security server device, comprising memory comprising programmed instructions stored thereon and one or more processors configured to be capable of executing the stored programmed instructions to:
    receive telemetry data collected based on instrumentation code executed at one of a plurality of client computing devices with a requested transaction with one of a plurality of web server systems;
    determine identifying signal data (IDSD) usable to identify the one of client computing devices based on the received telemetry data;
    identify any matching telemetry data in a telemetry data set for a plurality of prior transactions between one or more of the client computing devices and one or more of the web server systems based on any stored IDSDs that match the received IDSD;

generate a security score associated with the one of the client computing devices based on the identified matching telemetry data; and manage a response to the requested transaction to the one of client computing devices based on the generated security score.

12. The device of claim 11, wherein the security score comprises a confidence value in an identity of a user associated with the one of the client computing devices and the requested transaction.

13. The device of claim 11, wherein the security score comprises an indication that the security score meets a threshold to bypass an additional authentication procedure.

14. The device of claim 11, wherein the security score is based on whether any of the transactions associated with the identified matching telemetry data involving the one of the client computing devices were associated with any attack.

15. The device of claim 11, wherein the one or more processors are further configured to be capable of executing the stored programmed instructions to:

provide the generated security score to the one of the web server systems for the requested transaction; and receive an updated response to the requested transaction based on the generated security server from the one of the web server systems.

16. A network traffic management system, comprising one or more network security apparatuses, server devices, or client devices with memory comprising programmed instructions stored thereon and one or more processors configured to be capable of executing the stored programmed instructions to:

receive telemetry data collected based on instrumentation code executed at one of a plurality of client computing devices with a requested transaction with one of a plurality of web server systems;

determine identifying signal data (IDSD) usable to identify the one of client computing devices based on the received telemetry data;

identify any matching telemetry data in a telemetry data set for a plurality of prior transactions between one or more of the client computing devices and one or more of the web server systems based on any stored IDSDs that match the received IDSD;

generate a security score associated with the one of the client computing devices based on the identified matching telemetry data; and manage a response to the requested transaction to the one of client computing devices based on the generated security score.

17. The system of claim 16, wherein the security score comprises a confidence value in an identity of a user associated with the one of the client computing devices and the requested transaction.

18. The system of claim 16, wherein the security score comprises an indication that the security score meets a threshold to bypass an additional authentication procedure.

19. The system of claim 16, wherein the security score is based on whether any of the transactions associated with the identified matching telemetry data involving the one of the client computing devices were associated with any attack.

20. The system of claim 16, wherein the one or more processors are further configured to be capable of executing the stored programmed instructions to:

provide the generated security score to the one of the web server systems for the requested transaction; and receive an updated response to the requested transaction based on the generated security server from the one of the web server systems.

\* \* \* \* \*